Figure 1:
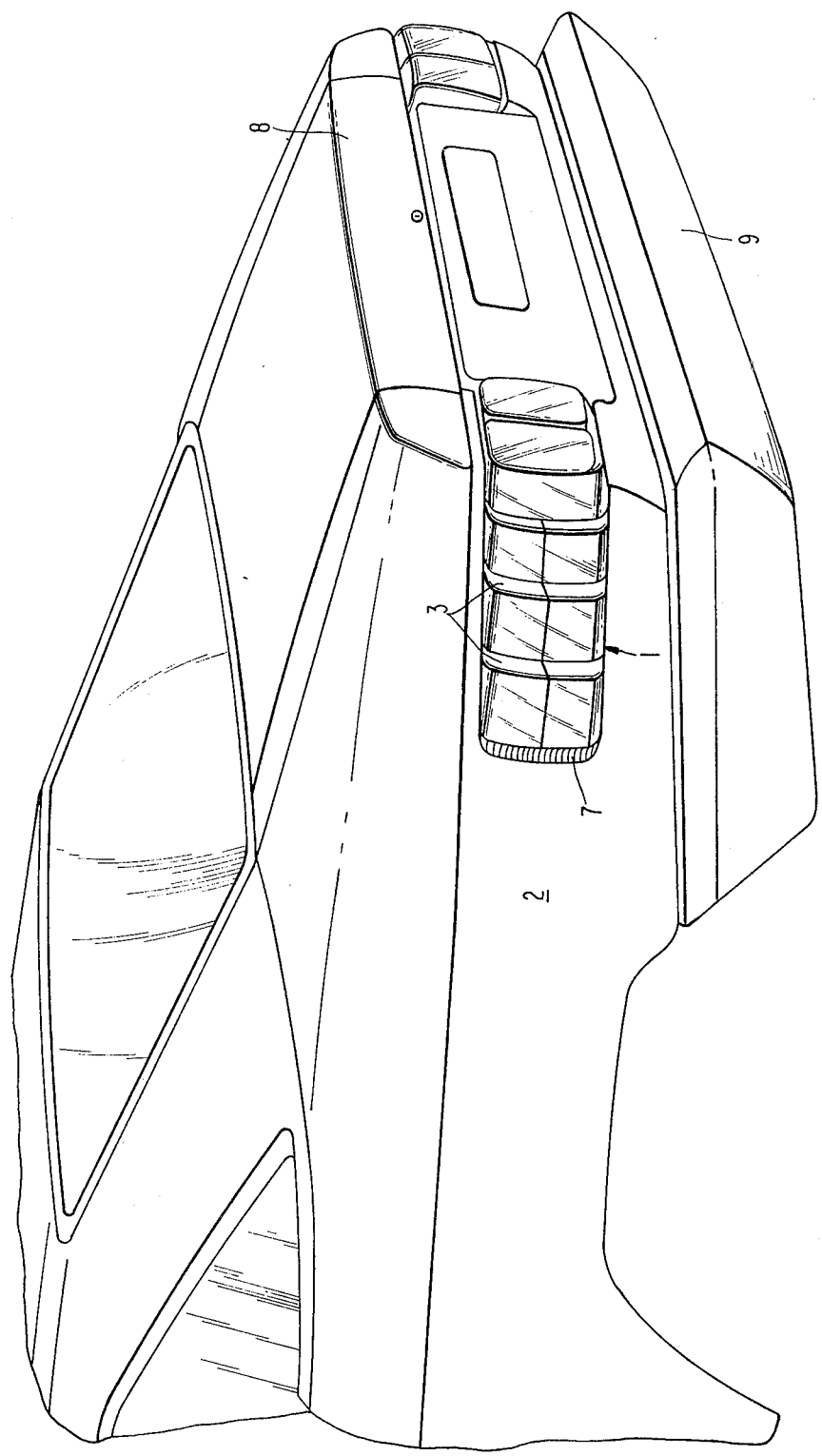

United States Patent [19]

Pfeiffer et al.

[11] 4,268,892

[45] May 19, 1981

[54] DIFFUSION LENS FOR REAR LIGHTS OF VEHICLES, ESPECIALLY MOTOR VEHICLES

[75] Inventors: Peter Pfeiffer; Johann Tomforde, both of Sindelfingen, Fed. Rep. of Germany

[73] Assignee: Daimler-Benz Aktiengesellschaft, Stuttgart, Fed. Rep. of Germany

[21] Appl. No.: 84,536

[22] Filed: Oct. 15, 1979

[30] Foreign Application Priority Data

Oct. 14, 1978 [DE] Fed. Rep. of Germany ....... 2844822

[51] Int. Cl.³ .................... B62D 23/00; B60Q 1/00
[52] U.S. Cl. ........................ 362/83; 296/1 S
[58] Field of Search ............. 362/83, 96; 296/1 S, 296/91

[56] References Cited

U.S. PATENT DOCUMENTS

| 2,258,812 | 10/1941 | Ross | 362/83 X |
| 3,032,645 | 5/1962 | Wilfert | 362/83 |
| 3,635,517 | 1/1972 | Wilfert et al. | 362/83 X |

FOREIGN PATENT DOCUMENTS

| 536755 | 4/1955 | Belgium | 362/83 |
| 1295126 | 11/1972 | United Kingdom | 296/1 S |

Primary Examiner—Donald A. Griffin
Attorney, Agent, or Firm—Craig & Antonelli

[57] ABSTRACT

A diffusion lens for rear lights of vehicles, especially of motor vehicles, which are drawn far about the vehicle rear section into the area of the side wall whereby the diffusion lens includes step-shaped offsets, as viewed in plan view, such that individual light exit surfaces are formed which are each disposed approximately in a vehicle transverse plane.

6 Claims, 2 Drawing Figures

DIFFUSION LENS FOR REAR LIGHTS OF VEHICLES, ESPECIALLY MOTOR VEHICLES

The present invention relates to a diffusion lens for rear lights of vehicles, especially of motor vehicles.

The present invention is concerned with the task to so construct and arrange rear lights of vehicles, especially of motor vehicles that they are exposed as little as possible to soiling, enable the use of a rear lid drawn down to the bumper and finally offer also largest possible reflected ray angles toward the side.

The underlying problems are solved according to the present invention in that the diffusion lens includes step-shaped offsets—as viewed in plan view—in such a manner that individual light exit surfaces are formed which are disposed approximately in a respective vehicle transverse plane.

A particularly effective anti-soiling and possibly a protection against icing up is realized if discharge openings of a ventilating system of the interior space of the vehicle are so arranged that discharged air sweeps past the laterally drawn area of the diffusion lens.

Accordingly, it is an object of the present invention to provide a diffusion lens for rear lights of vehicles, especially of motor vehicles which avoids by simple means the aforementioned shortcomings and drawbacks encountered in the prior art.

Another object of the present invention resides in a diffusion lens for rear lights of vehicles, especially of motor vehicles, which is so constructed and arranged that it is exposed to as little soiling as possible.

A futher object of the present invention resides in a diffusion lens for rear lights of motor vehicles which not only makes available large light reflection angles toward the side but also permits the rear lid of the luggage space to be drawn down to the bumper.

Still another object of the present invention resides in a diffusion lens for rear lights of the type described above which not only offers protection against soiling but also against icing up in cold weather.

Figure 2:
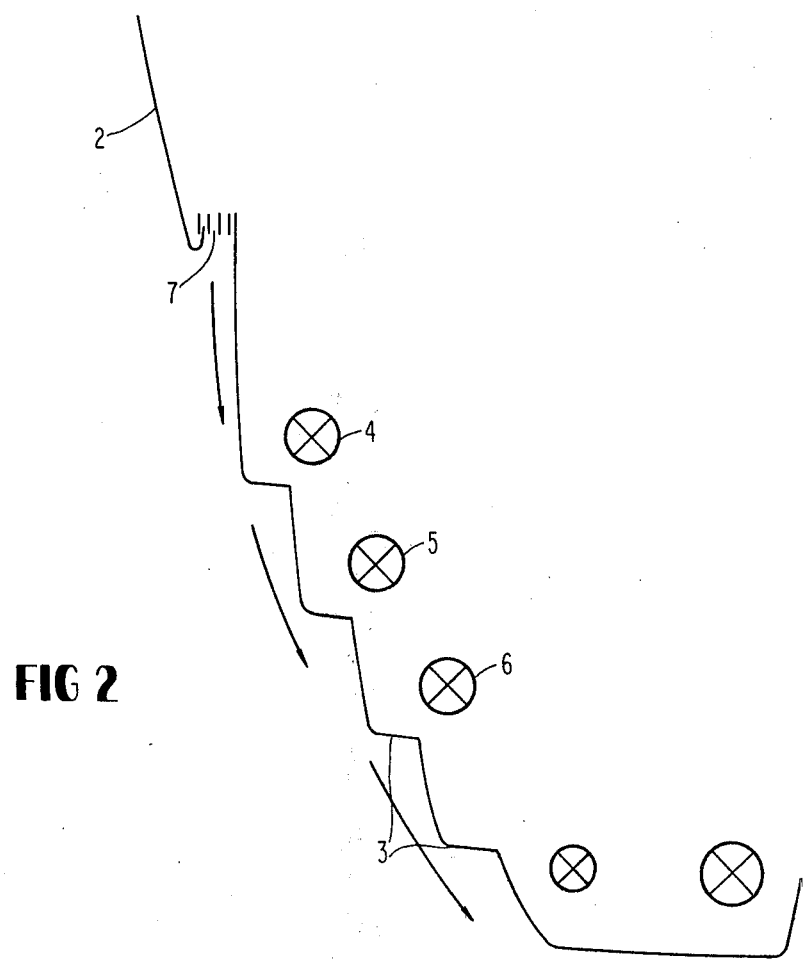

These and other objects, features and advantages of the present invention will become more apparent from the following description when taken in connection with the accompanying drawing which shows, for purposes of illustration only, one embodiment in accordance with the present invention, and wherein:

FIG. 1 is a perspective view of the rear portion of a passenger motor vehicle which is equipped with a diffusion lens in accordance with the present invention; and FIG. 2 is a schematic plan view of a diffusion lens in accordance with the present invention.

Referring now to the drawing wherein like reference numerals are used throughout the two views to designate like parts, the diffusion lens generally designated by reference numeral 1 which is shown in FIG. 1 of the drawing is drawn far into the area of the side wall 2 of the vehicle and includes step-shaped offsets or shoulders, by means of which light exit or light-emitting surfaces 3 are formed which are each disposed approximately in a vehicle transverse plane. At least one offset, respectively, one light exit surface 3 is thereby preferably coordinated to different individual lamps—for example, to the incandescent lamp 4 (FIG. 2) for a fog rear light, incandescent lamp 5 for a back-up light and incandescent lamp 6 for a turn-indicator light. These light exit or light-emitting surfaces 3 remain far-reachingly free of dirt by reason of their location. However, the ability of keeping the surfaces 3 free of dirt is further improved in that air discharge openings 7 of an interior space ventilating system are so arranged that the air leaving therethrough sweeps past the diffusion lens 1 as is indicated schematically in FIG. 2 of the drawing by arrows.

By reason of the fact that significant parts of the rear lights are displaced into the area of the side wall 2, there additionally results the advantage that the luggage space lid 8 (FIG. 1) can be drawn or extended down directly up to the bumper 9, whence the accessibility of the luggage space is considerably improved.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A diffusion lens for rear lights of vehicles, which diffusion lens is drawn about the vehicle rear section and far into the area of the side wall of the vehicle, characterized in that the diffusion lens includes within said area of the side wall of the vehicle step-shaped offsets—as viewed in plan view—in such a manner that individual light exit surfaces are formed that are disposed approximately in vehicle transverse planes.

2. Diffusion lens according to claim 1, characterized in that at least one offset is provided for each individual lamp as viewed in plan view of the light exit surfaces.

3. A diffusion lens according to claim 1 or 2, characterized in that means forming at least one discharge opening of a ventilating system of the interior space of the vehicle are so arranged that discharged air sweeps past the area of the diffusion lens drawn laterally about the vehicle rear section.

4. A diffusion lens according to claim 3, characterized in that the offsets are covered off toward the outside by a smooth surface.

5. A diffusion lens according to claim 1, characterized in that the offsets are covered off toward the outside by a smooth surface.

6. Diffusion lens according to claim 5, characterized in that at least one offset is provided for each individual lamp as viewed in plan view of the light exit surfaces.

* * * * *